United States Patent [19]

Oshiga et al.

[11] Patent Number: 5,065,307
[45] Date of Patent: Nov. 12, 1991

[54] APPARATUS FOR INSULATING AND PREVENTING NOISE IN THE OUTPUT OF A SEQUENCE CONTROLLER

[75] Inventors: Takayuki Oshiga, Narashinoshi; Katsuhiro Fujiwara, Sakurashi; Kazunori Umeda, Narashinoshi, all of Japan

[73] Assignee: Hitachi, Ltd., Tokyo, Japan

[21] Appl. No.: 398,530

[22] Filed: Aug. 25, 1989

[30] Foreign Application Priority Data

Sep. 5, 1988 [JP] Japan .................................. 63-220354

[51] Int. Cl.$^5$ .......................... G05B 9/02; G05B 11/01
[52] U.S. Cl. .................................... 364/140; 364/184; 361/17; 307/543; 307/544
[58] Field of Search ................... 364/140, 184, 474.19; 361/6, 15, 16–17, 88, 91; 307/41, 89, 543, 544

[56] References Cited

U.S. PATENT DOCUMENTS

| | | | |
|---|---|---|---|
| 4,567,556 | 1/1986 | Onogi et al. | 364/140 |
| 4,740,883 | 4/1988 | McCollum | 364/140 |
| 4,745,540 | 5/1988 | Hamada et al. | 364/140 |

Primary Examiner—Jerry Smith
Assistant Examiner—Paul Gordon
Attorney, Agent, or Firm—Antonelli, Terry, Stout & Kraus

[57] ABSTRACT

A built-in insulating element for electrically insulating a process portion from a control object and for transmitting a process result to the control object is provided in the output portion for transmitting the process result of a sequence controller to the control object. Further, a noise preventive element is provided in the output portion for preventing a noise voltage from coming in from the control object side and damaging the insulating element.

11 Claims, 3 Drawing Sheets

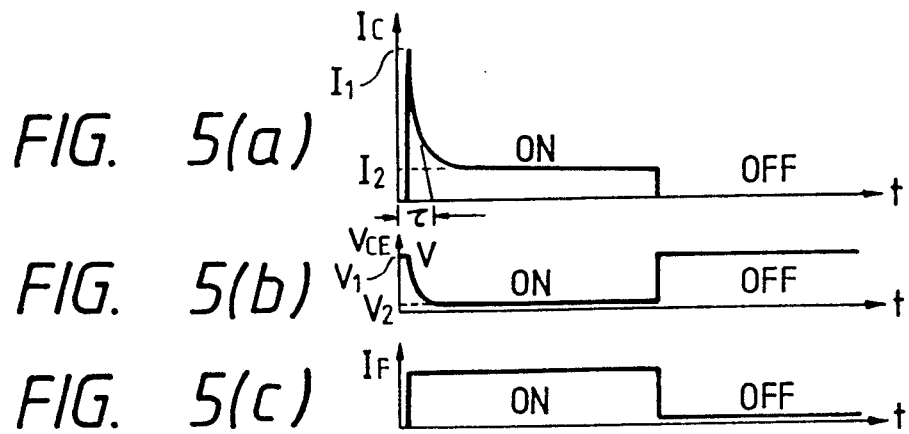
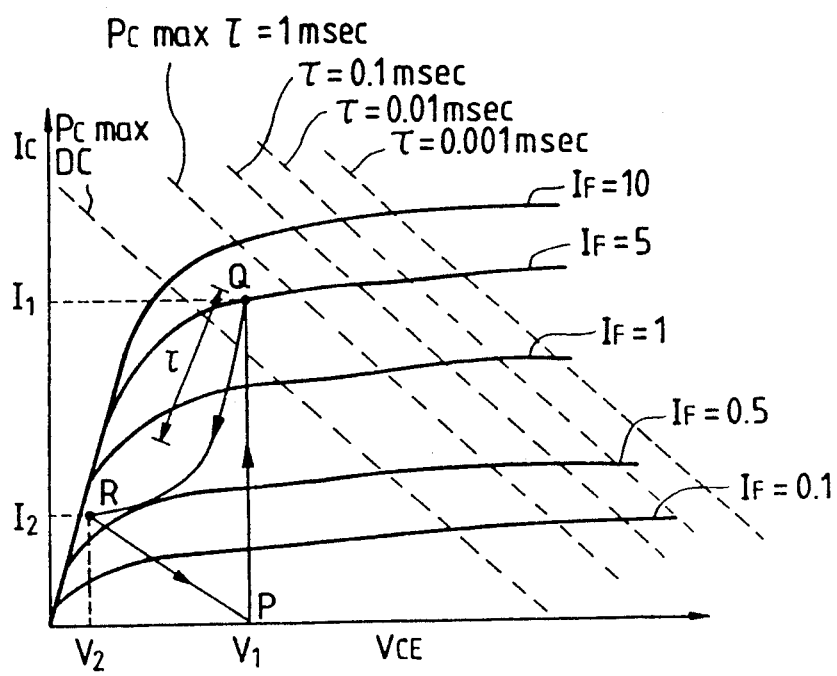

APPARATUS FOR INSULATING AND PREVENTING NOISE IN THE OUTPUT OF A SEQUENCE CONTROLLER

BACKGROUND OF THE INVENTION

The present invention relates to a sequence controller, especially a sequence controller in which a malfunction caused by electrical noises introduced from the outside is prevented.

Generally, a sequence controller performs a prescribed sequence process following a sequence program which is set beforehand based on the input data from a control object (external load) showing the external condition, and the process result is output to the control object through an output portion. An electronic circuit, such as an arithmetic circuit, which constitutes a sequence controller is generally constituted with a TTL circuit, and the signal level is low in the order of 5 VDC. On the other hand, the power supply voltage for signals of a control object such as an external output load or an external input system is as high as 24 VDC or 100/200 VAC, so that when an external signal is turned ON or OFF, a still higher surge voltage (1 kV to 2 kV) can be induced.

To prevent an electronic circuit of a low voltage level from being subjected to a malfunction effected by a noise voltage of a high level, a control object (external load) and the arithmetic circuit (electronic circuit) of the sequence controller are connected to an insulating element, such as a photocoupler. Both of these circuits are optically coupled for transmitting a process result and also for preventing noise transmission in the direction of the flow of an ordinary signal by electrical insulation.

The technique mentioned above is an effective method for preventing a malfunction of an electronic circuit by cutting off electric noises from the control objects, but a surge voltage from a noise generating source is applied to the wirings of control objects through stray couplings in various parts. If the noise voltage is a continuous high frequency pulse-formed high voltage (generally called a burst noise), such as a noise generated when an AC magnet-switch is turned off, it travels through an insulating element through stray coupling. In an output portion, especially, the noise from a control object is applied directly to the output side of the insulating element in a direction opposite to that of an ordinary signal flow, which causes a malfunction in the electronic circuit.

Because of this, a malfunction can be caused by noise in the output circuit following the insulation element even though a correct process result is transmitted from an arithmetic circuit.

SUMMARY OF THE INVENTION

An object of the present invention is to provide a sequence controller in which a malfunction caused by noise transmitted to an output portion from a control object is prevented.

To achieve the above-mentioned object, the sequence controller comprises an input portion which receives input data from a control object, a process portion which processes data according to a sequence program which is set beforehand based on the input data from the input portion, and an output portion which electrically insulates the process portion from the control object and also transmits a process result to the control object from the process portion. The output portion has a preventive element for lowering the noise voltage level induced from the control object side.

According to the present invention, the noise voltage level which is induced in the opposite direction to that of an ordinary signal flow can be lowered in the output portion, so that it is possible to prevent a malfunction in the output portion.

BRIEF DESCRIPTION OF THE DRAWINGS

FIG. 5(a)-(c) shows signal waveforms of various parts, in the circuit shown in FIG. 4; and FIG. 6 shows a characteristic diagram of the operation of the circuit shown in FIG. 4.

DESCRIPTION OF THE EMBODIMENTS

The embodiments according to the present invention will be described in detail in the following.

Figure 1:
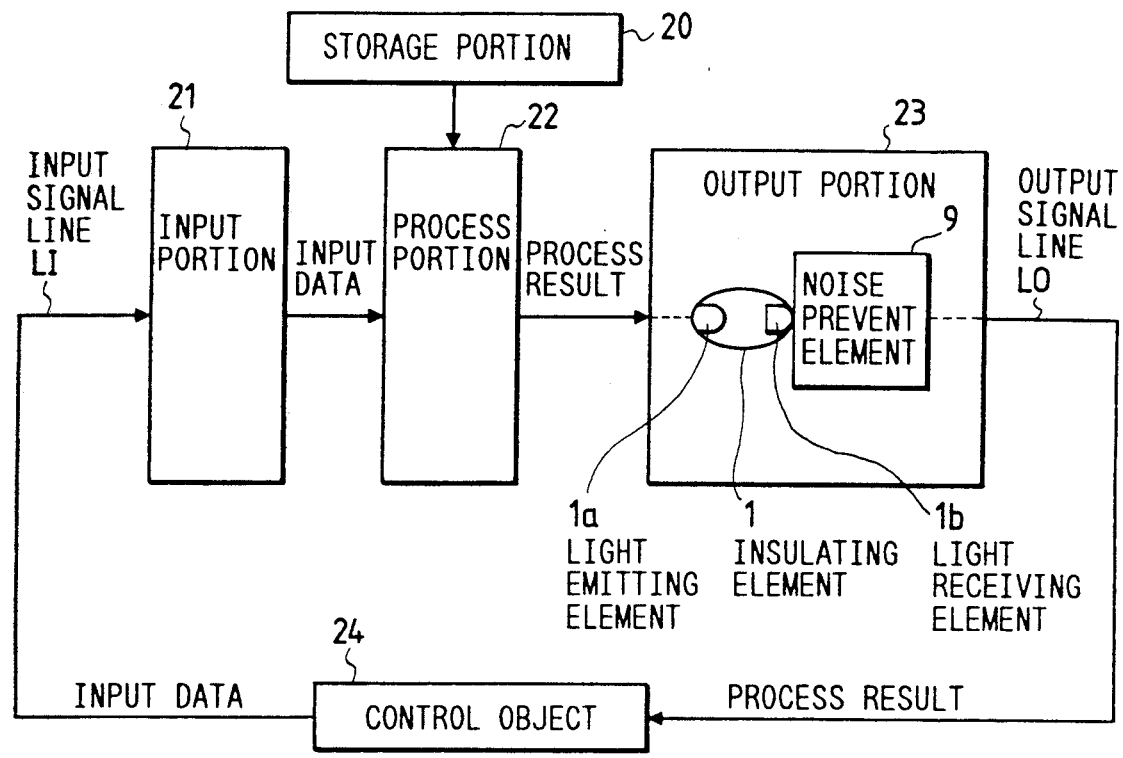
FIG. 1 is a schematic block diagram showing an embodiment of the present invention.

In FIG. 1, 20 is a storage portion for storing a sequence program which is set beforehand; 21 is an input portion for receiving data expressing a condition from a control object 24 as a load; 22 is a process portion for processing the input data from the input portion 21 according to the program stored in the storage portion 20; 23 is an output portion for transferring a control result to the control object 24 receiving the process result of the process portion 22.

The part 1 in the output portion 23 is an insulating element (photocoupler) for electrically insulating the process portion 22 from the control object 24 and also for optically coupling them. The insulating element 1 comprises a light emitting element 1a having a light emission diode and a light receiving element 1b having a light receiving transistor. The part 9 is a noise preventive element for preventing a noise voltage induced in the output line LO of the control, object 24 from being transmitted to the insulating element 1.

An insulating element for electrically insulating the process portion from the control object 24 is also included in the input portion 21, though it is not shown in the drawing.

In the constitution as shown in FIG. 1, the control objects 24 represent many kinds of driving equipment to be provided in a production line, for example, and many kinds of sensors for detecting the operating condition of the production line and the operating condition of the driving equipment. A sensor generates input data and sends that data out to the input portion 21, and each kind of the driving equipment performs a specified operation on receiving a process result etc. from the output portion 23.

Figure 2:
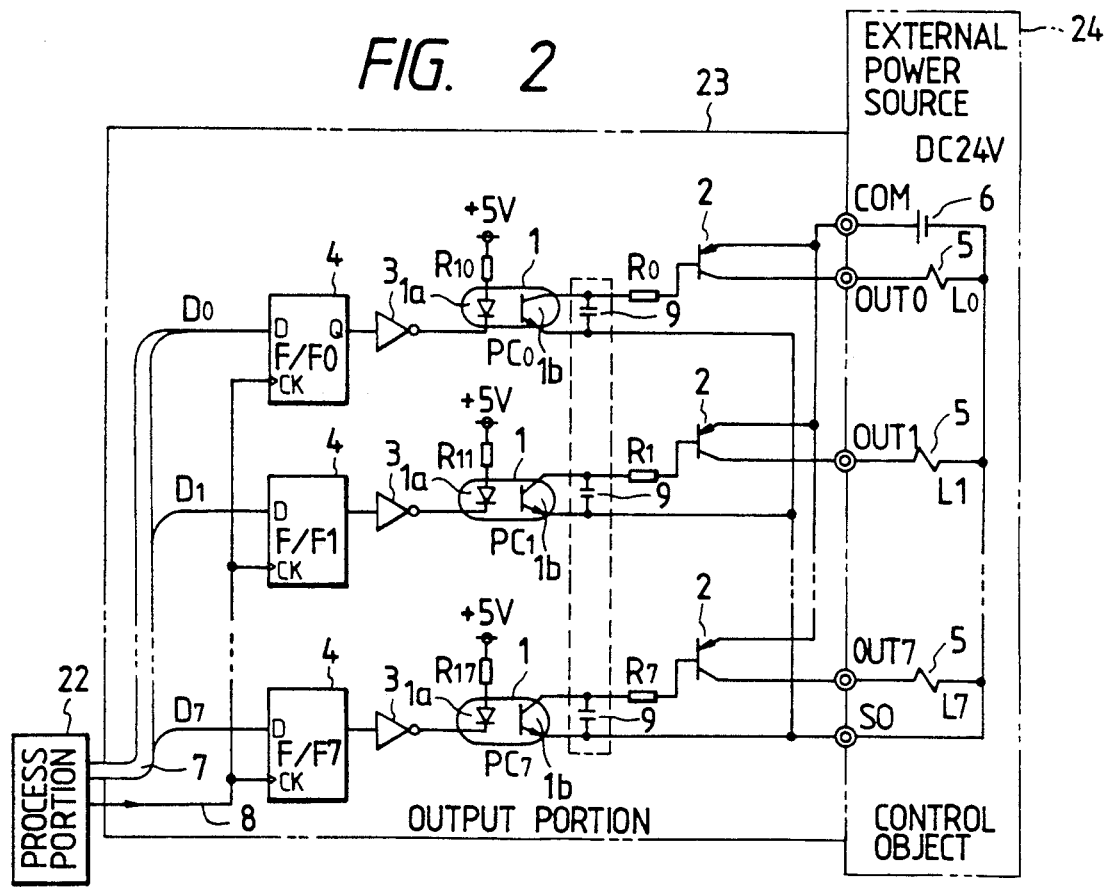
FIG. 2 is a schematic circuit diagram showing the inside of the output portion of an embodiment of the present invention.

A detail description on the output portion 23 is given in the following. In FIG. 2, 1 is a photocoupler (insulating element) comprising a light emission diode 1a and a light receiving transistor 1b; 2 is a power transistor for amplifying an output signal of the transistor 1b; 3 is a buffer gate; 4 is a flip-flop circuit for storing data; 5 is an external load representing control objects L0 to L7, to be concrete they are a driving coil for a magnetic contactor and a motor etc.; and 6 is a common external power supply for supplying electricity to the external loads.

A process result (output data) calculated in the process portion 22 is transmitted to the output portion 23 through a data bus 7 and is stored in the flip-flop circuit 4, which forms a storage means for output data, in synchronism with a latch signal 8 output from the process portion 22.

The output data stored in the flip-flop circuit 4 drives the photocoupler 1 through a buffer gate 3. The photocoupler 1 transmits the output signal from the buffer gate 3 to the power transistor 2 while performing electrical insulation.

The power transistor 2 performs power amplification of the output signal and drives the load 5. The part 9 is a bypass capacitor operating as a noise preventive element connected to the output circuit of the light receiving transistor 1b, that is, between the collector and the emitter thereof. The transistor 1b usually has a stray capacitance between the collector and the base, and the value is 2 or 3 pF. The capacitance of the bypass capacitor 9 is set to be large enough in comparison with the stray capacitance.

Figure 3:
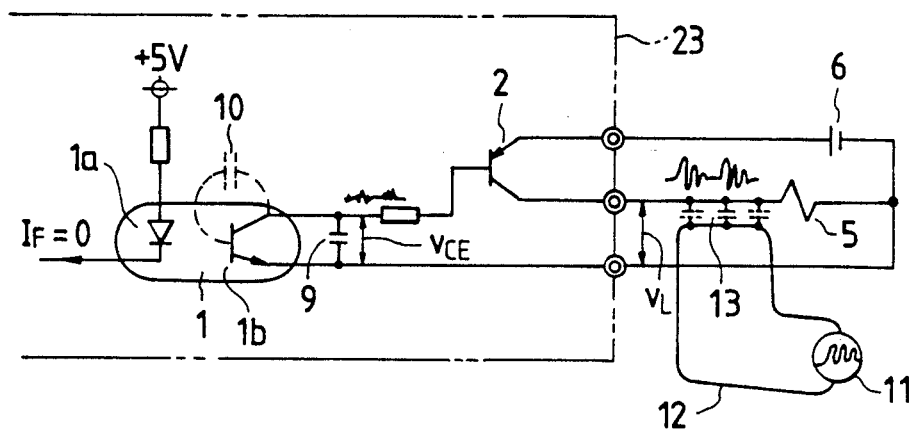
FIG. 3 is detail view of the operation principle of the present invention.

FIG. 3 is detail circuit diagram showing a way in which noise is transmitted by a control object in FIG. 2. The part 11 is a noise generating source; 12 is wiring connected to the noise generating source 11; and 13 is the stray coupling capacitance which exists between the wiring 12 and the wiring of the eternal load 5.

When noise is generated from the noise generating source during the operation of the sequence controller, the noise voltage is applied to the wiring of the external load 5 from the wiring 12 through the stray coupling capacitance 13 between wirings. The noise voltage is applied to the output side of the photocoupler through the wirings in the circuit in the opposite direction to that of the flow of an ordinary signal. To be more specific, the noise voltage is applied between the collector and the emitter (in FIG. 3, the part marked as VCE) of the power output transistor 1b. If the bypass capacitor 9 is not provided, as there is a stray capacitance 10 between the collector and the base, the noise voltage is applied to the base from the collector through the stray capacitance 10. When the noise generating source 11 is an AC magnet-switch and the noise is a burst noise, such as the one generated when the switch is turned off, the noise voltage applied to the base becomes significantly high to cause a flow of a base current. By using the bypass capacitor 9, which is set to be large enough in comparison with the stray capacitance 10, the noise voltage applied between the collector and the emitter of the transistor 1b is bypassed by the bypass capacitor 9, which is easier for a noise signal to pass through than the stray capacitance 10. Therefore, the level of the noise voltage applied between the collector and the emitter can be reduced to a value that it is small enough not transmitted to the base. It is therefore possible to prevent base current from flowing in response to a noise voltage, which prevents the occurrence of a malfunction.

In the following, a description of the safety operating region of the transistor in the photocoupler is considered.

Figure 4:
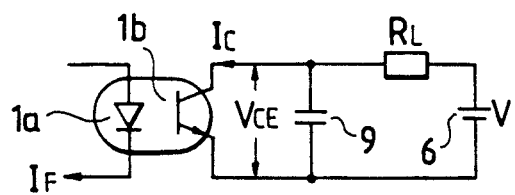
FIG. 4 is an equivalent circuit diagram for explanation of the operation of a fixture of the invention.

FIG. 4 is an equivalent circuit diagram of the photocoupler and its output portion shown in FIG. 3. IF is the current of the light emission diode 1a; IC is a collector current of the transistor 1b; VCE is the voltage between the collector and the emitter of the transistor 1b; V is an external power supply voltage; and RL is an external load. When the photocoupler is in an OFF condition, that is, when the transistor is in an OFF condition, the capacitor 9 is charged by the voltage V of the external power supply 6 [FIG. 5 (b)], so that the voltage VCE is equal to the voltage V. When the current IF starts to flow, as shown in FIG. 5(c), the transistor turns ON and a rush or surge current IC flows from the capacitor 9 instantaneously, The larger the capacitance of the capacitor 9, the larger will be the surge value of the current, and if the current becomes too large, the transistor can be destroyed. Thereby, the capacitance of the bypass capacitor should be set so that the value of the current IC may not exceed the maximum allowable collector current of the transistor. Because of this, the value of the capacitor C is set to be larger than the stray capacitance between the collector and the base of the transistor 1b and not so large that its discharge current will destroy the transistor.

The rush or surge current as shown in FIG. 5(a) flows for a time ($\tau$) of a certain time constant. The time constant is determined by the capacitance of the capacitor 9 and an internal resistance between the collector and the emitter. When the current-flowing time ($\tau$) is too long, the generated loss can exceed the allowable collector loss of the transistor and the transistor can be destroyed. Therefore, the capacitance of the capacitor 9 shall be set to have a current-flowing time not so long as to destroy the transistor considering the ratings of the transistor. It is therefore necessary to set the value of the capacitor C to be large enough in comparison with the stray capacitance, and to set the discharge time constant smaller than the value which may destroy the transistor.

FIG. 6 is an operation characteristic diagram showing the stable operation region of a transistor. In the figure, the relation between IC and VCE when IF is taken as a parameter is shown with a full line, and the allowable collector loss of the transistor when the time constant is taken as a parameter is shown with a broken line. The stable operation region is the space surrounded by a full line, a broken line and the axis of abscissas. PC represents a collector loss.

FIG. 5 shows the change of IC and VCE in the ON, OFF operation of the transistor 1b following the ON (emission of light), OFF (no emission of light) operation of the light emission diode 1a. The operation point at the time of the occurrence of IC rush current following the ON operation of the transistor 1b is shown in FIG. 6. In the figure, when the transistor is OFF the operation point is at point P, and when the transistor is turned ON to start a rush current flowing, IC is at a peak and the operation point is at point Q, and when the transistor is in a stable ON condition the operation point is at point R, and when the transistor is again turned OFF, the operation point returns to point P.

A proper value of the bypass capacitor 9 is practically in the range of 100 to 10,000 pF.

The time constant ($\tau$) in this case is less than 1/1,000,000 sec. In FIG. 6 it is expressed by $\tau = 0.001$ msec., and the stable operation region is broadened to have enough margin, so that it is possible to prevent damage to the function or life of the transistor caused by a rush current.

In the above-mentioned embodiment, as the base of a transistor for the photocoupler is not used, a photocoupler of four lead wires (2 for a light emission diode, 2 for a transistor) having no base terminal can be adopted; therefore, in comparison with a case where a photocoupler of 6 lead wires having a base terminal (1 is blank) is used, the mounting density on a substrate etc. can be improved. Besides a photocoupler, a transformer or a Hall element of magnetic coupling type can be used as an insulating element.

By a method according to the present invention, the noise resistant capability of a programmable controller against a so called burst noise can be remarkably improved.

A method according to the present invention is effective especially for the EFT (Electrical Fast Transient) noise test provided in the international standard IEC 801-4.

What is claimed is:

1. A sequence controller for controlling a control object, comprising:
    a storage portion including means for storing a sequence program;
    an input portion including means for receiving input data from said control object;
    a process portion including means for processing data according to said sequence program based on input data received from said input portion and for producing a process result; and
    an output portion having a built-in insulating element for electrically insulating said process portion from said control object, and means for transmitting a process result received from said process portion to said control object through said insulating element;
    said output portion having a noise preventive element for preventing a noise voltage induced from said control object from damaging said output portion.

2. A sequence controller according to claim 1, wherein said output portion comprises a noise preventive element mounted between said insulating element and said control object for preventing a noise voltage induced from said control object from being applied to the output side of said insulating element.

3. A sequence controller for controlling a control object, comprising:
    a storage portion including means for storing a sequence program;
    an input portion including means for receiving input data from said control object;
    a process portion including means for processing data according to said sequence program based on input data received from said input portion and for producing a process result; and
    an output portion having a built-in photocoupler comprising a light emitting body and a light receiving body for electrically insulating said process portion from said control object, and means for transmitting a process result received from said process portion to said control object;
    said output portion comprising a noise voltage preventive element mounted between said photocoupler and said control object for preventing a noise voltage induced from said control object from being applied to said photocoupler.

4. A sequence controller according to claim 3, wherein said noise voltage preventive element is provided between the light receiving body of said photocoupler and said control object for preventing the noise voltage induced from said control object, in the opposite direction to the normal signal flow, from being applied to the light receiving body of said photocoupler.

5. A sequence controller for controlling a control object, comprising:
    a storage portion including means for storing a sequence program;
    an input portion including means for receiving input data from said control object;
    a process portion including means for processing data according to said sequence program based on input data received from said input portion and for producing a process result; and
    an output portion having a built-in photocoupler comprising a light emitting body and a light receiving transistor for electrically insulating said process portion from said control object, and means for transmitting a process result received from said process portion to said control object through the output terminal of said light receiving transistor;
    said output portion comprising a capacitance element connected between said photocoupler and said control object for preventing a noise voltage induced from said control object from being applied to the output terminal of said light receiving transistor.

6. A sequence controller according to claim 5, wherein said transistor has a collector and an emitter, and said output portion is so constituted that a process result received from said process portion is supplied to said control object through the collector and emitter of said transistor, and said capacitance element comprises a bypass capacitor connected between said collector and emitter for preventing a noise voltage induced from said control object from being applied to the collector of said transistor.

7. A sequence controller according to claim 6, wherein said bypass capacitor is set to have a large capacitance in comparison with the stray capacitance between the collector and the base of said transistor and is also set to have a sufficiently short discharging time constant to not destroy said transistor.

8. A sequence controller according to claim 6, wherein said bypass capacitor is set to have a large capacitance in comparison with the stray capacitance between the collector and the base of said transistor.

9. A sequence controller according to claim 6, wherein said bypass capacitor is set to have a large capacitance in comparison with the stray capacitance between the collector and the base of said transistor and also is set to have a capacitance not so large as to allow a discharge current flow to destroy said transistor.

10. A sequence controller according to claim 5, wherein said transistor has a collector and an emitter, and said output portion is so constituted that a process result received from said process portion is supplied to said control object through the collector and emitter of said transistor, and said capacitance element comprises a bypass capacitor for preventing a noise voltage induced from said control object from coming into the base of said transistor through the stray capacitance between the collector and the base of said transistor.

11. A sequence controller for controlling a control object, comprising:
    a storage portion including means for storing a sequence program;
    an input portion including means for receiving input data from said control object;

a process portion including means for processing data according to said sequence program based on input data received from said input portion and for producing a process result; and an output portion having a built-in photocoupler comprising a light emitting body and a light receiving transistor for electrically insulating said process portion from said control object, and means for transmitting a process result received from said process portion to said control object through said photocoupler;

said output portion being so configured that a collector and an emitter of said transistor are electrically connected to said control object for the transmission of said process result, and including a bypass capacitor connected between the collector and the emitter of said transistor for preventing a noise voltage induced from said control object from being applied between the collector and emitter terminals of said light receiving transistor.

* * * * *